April 21, 1953     A. W. RICHARDS ET AL     2,635,854
TOOL ROTATOR FOR RECIPROCATING HAMMERS
Filed Sept. 12, 1950                                     3 Sheets-Sheet 3

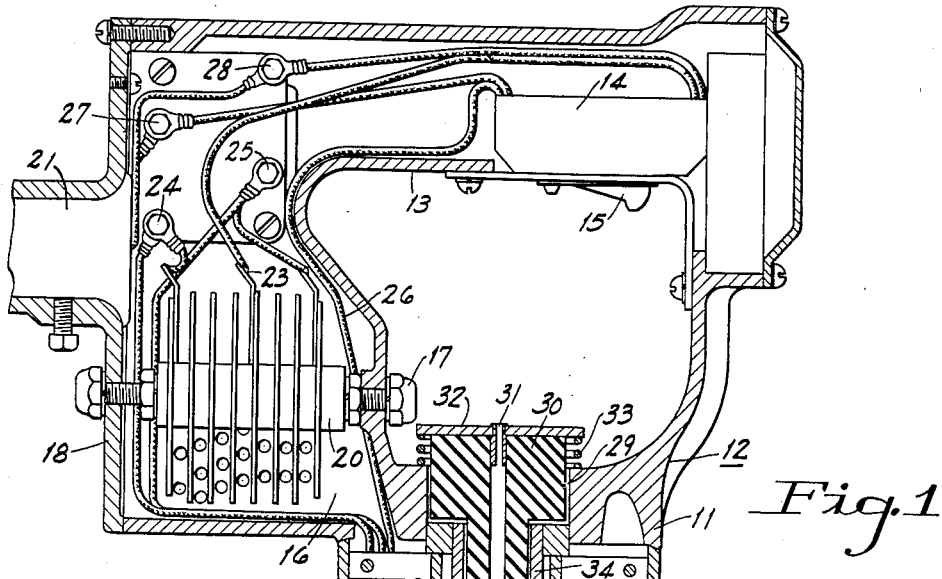

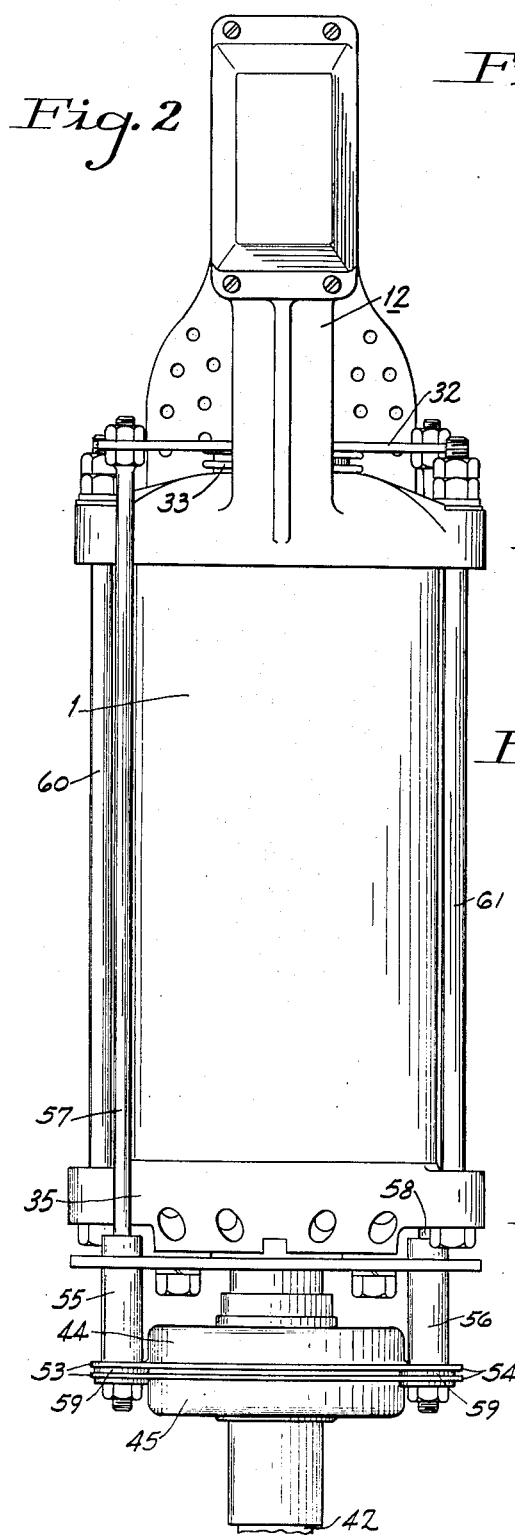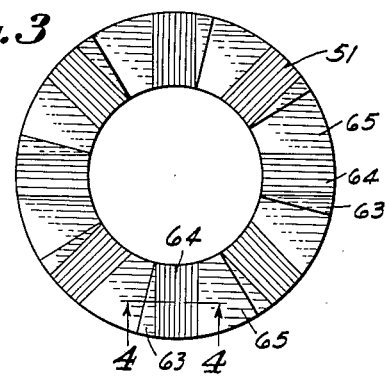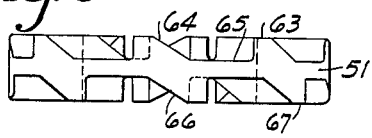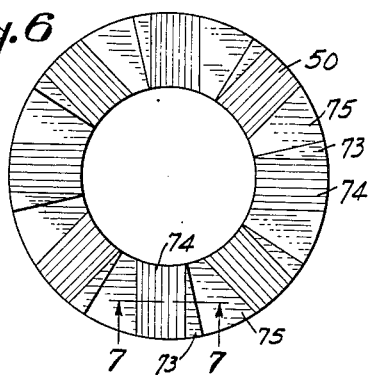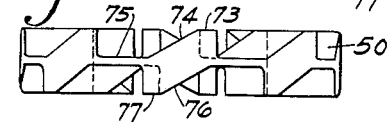
INVENTOR.
Archer W. Richards and
Ervin J. Osterhus
BY
William D. Carothers
Their Attorney.

INVENTOR.
Archer W. Richards and
Ervin J. Osterhus
BY William D. Carothers
Their Attorney.

Patented Apr. 21, 1953

2,635,854

UNITED STATES PATENT OFFICE 2,635,854

TOOL ROTATOR FOR RECIPROCATING HAMMERS

Archer W. Richards, Chagrin Falls, and Ervin J. Osterhus, Cleveland, Ohio, assignor to Syntron Company, Homer City, Pa., a corporation of Delaware Application September 12, 1950, Serial No. 184,357

12 Claims. (Cl. 255—43)

This invention relates generally to mechanical movements that translate reciprocating motion to rotary motion and more particularly to a device for rotating a reciprocating drill while cutting a hole by impact of forces.

This invention is particularly advantageous for use with all types of reciprocating drills as it provides an exceedingly inexpensive structure for accomplishing what now requires a pawl and ratchet drive or a drive by means of a rotary motor coupled through a train of gears and a clutch.

In the structure comprising this invention the tool holder must be free to reciprocate and free to rotate and, thus, be movably supported relative to the device. The drill bit is removable from the tool holder. By providing opposed concentric annular surfaces, one surface on the tool holder and the other on the device itself, a flexible pawl may be placed between these surfaces and coact therewith to rotate one relative to the other. Such a flexible pawl rotates the free element when it is compressed between the two annular surfaces and the rotary action is intermittent, as it takes place only upon the compression of the pawl in its normally flexible direction. To speed up the rotary motion another flexible pawl may be placed between opposed annular surfaces effective to compress this second pawl upon the rebound or return movement of the reciprocating device. The normal flexure of the rebound flexible pawl should be reversed or of the opposite hand from the first flexible pawl in order to maintain the rotation of the tool in the same direction. If both flexible pawls are of the same hand and are actuated by the action and reaction forces, then an oscillatory motion is transmitted to the bit.

The full reciprocating stroke of the tool may be within or greater than the total flexing dimension of the flexible pawls. The blow of the reciprocating member must be effective to flex the pawl whether or not the tool travels the full or only a portion of its capable stroke. However, it is preferable to initially preload the pawls between the reaction surfaces to a predetermined degree for the purpose of determining the available contact pressure and thus the available torque for rotating the tool.

The character of the back stop affects the timing. This stop may be rubber or springs, or a combination of both. The back or bumpers stop can be designed to absorb some of the force delivered by the free piston and thereby increase the dwell of the piston at the back end of its stroke. Thus the top bumper stop functions as a storage for compressive forces and as a factor in the tuning, all of which results in the timing of the pistons. By properly tuning the mechanical vibrating system the period of reciprocation of the piston can be varied to properly coincide with the timing of the magnetic pull by the energized electromagnetic coils.

The rubber bumper stop is compressed and stores energy which is later returned to the piston. Such absorption slows down the piston and the dwell period of the piston is determined by the absorption of the stop. The resiliency of the stop and the mass of the piston must be balanced with the magnetic pull and thus the frequency of the driving impulses maintains uniform operation and induces pickup with acceleration to effect a proper blow. The action of the pawl and the operation of the piston between the tool holder and its stop must be tuned to prevent the piston from getting out of synchronism with the frequency of the driving forces.

It has been found preferable to provide a reciprocating hammer with dual cams operating between two pairs of opposed annular surfaces. The annular surfaces carried by the tool holder or chuck being the opposite sides of an annular radial flange preferably formed integral therewith and the surfaces on the casing may be in the form of cupped washers which are co-extensive with the surfaces of the annular flange and are rigidly connected together and enclosing the annular radial flange. The cup members are spaced to initially compress the cam members. The degree of compression may be determined by the thickness of spacer washers between the cup members. The thicker the washer the less the initial compression of the resilient cam members. When the resilient pawl members have aged and taken on a set, the initial loading of the cams has been reduced. The spaced washers may then be removed allowing the cups to come closer together and, thus, renew the initial loading on the cam members. These cups may be connected to the rear of the casing by the tie rods that form a movable frame. Each rod extends along the opposite side of the device and is connected to the opposite ends of a cross plate that carries a resilient bumper or stop suspended for movement in the path of the reciprocating member on its rebound or return stroke. Thus, the striking element of the reciprocating device moves between the tool holder on one end and the resilient stop or bumper on the other end of the tool. The tool holder, supported by the cam assembly which is enclosed by the cups and connected by the tie rods to the rear of the device for connection with the back stop, constitutes a frame which is movable relative to the device and in either direction. A spring is compressed between the frame and the device to urge the tool holder back toward the striking element. This spring is not necessary to the operation of the device but merely prevents the frame from being loose and noisy. The flexible pawls are annular rings made of an elastomer material such as rubber, plastic or a synthetic rubber, or it may be constructed of flexible flat metal spring elements extending from a ring and sloping in one direction or an elastomer with metal inserts. Such a steel spring pawl should react against a knurled surface or even a shallow toothed surface. However, the preferable form is an integral annulus, the whole of which is a flexible elastomer having a series of angularly disposed lever members tied together with a web that completes the annulus. Since the structure is an annulus, the angularity of the disposed levers terminates in radial triangular portions which in this instance have been chosen to be the feet or surface engaging portions of the pawls. The levers may remain substantially uniform in cross section for their full radial extent, even though the feet taper to a point in the center of the annulus. The angular position of the levers of the pawls offers a resistance to compression which functions to cause rotary movement. The angle of the levers to the web of an elastomer pawl is preferably about 30° in the structure disclosed. If made 45° the deflection is too great and if made only 20°, it becomes too slow in reaction, so the angle must be between 20° and 45° with a preferable 30°, which are typical for a rubber and aluminum or steel combination. However the angle is dependent upon the resiliency of the material and its coefficient of friction when in contact with the annular surface. Within this possible range is an optimum angle capable of resulting in desired speed-torque characteristics.

The positive forward or working blow and the positive return stroke are both effective in compressing only one of the pawls, and for light machines the web of this flexible pawl may be made heavier than the web of the other flexible pawl which is effective in rotating the tool upon reactive forces of the heavier pawl. However in heavier machines the webs may be of the same thickness. The thickness of the web directly affects the torque for rotating the tool. The heavy web permits the flexible pawl to withstand the shock of the blow which allows the pawl to absorb enough energy to rotate the tool under load, but the tool holder, at the time of rotation is substantially free. If the tool holder is designed to have continuous end thrust, it should be provided with an antifrictional thrust bearing. Here the end thrust is intermittent and actual rotation occurs during periods of little or no thrust and any mating end faces must be designed for impact resistance.

One of the principal objects of this invention is the provision of an inexpensive structure that will rotate a reciprocating drill.

Other objects and advantages will be found hereinafter in the following description and claims.

The accompanying drawings show for the purpose of exemplification, without limiting the invention or claims thereto, certain practical embodiments comprising this invention wherein:

Fig. 1 is a sectional view through the reciprocating tool comprising this invention.

Fig. 2 is a front elevation of the tool as shown in Fig. 1.

Fig. 3 is a plan view of one of the pawl members.

Fig. 4 is a cross sectional view taken from the line 4—4 of Fig. 3.

Fig. 5 is a view in side elevation of the pawl as shown in Figs. 3 and 4.

Fig. 6 is a plan view of the other pawl member.

Fig. 7 is a sectional view taken from the line 7—7 of Fig. 6.

Fig. 8 is a view in side elevation of the pawl as shown in Figs. 6 and 7.

Figures 9, 10:
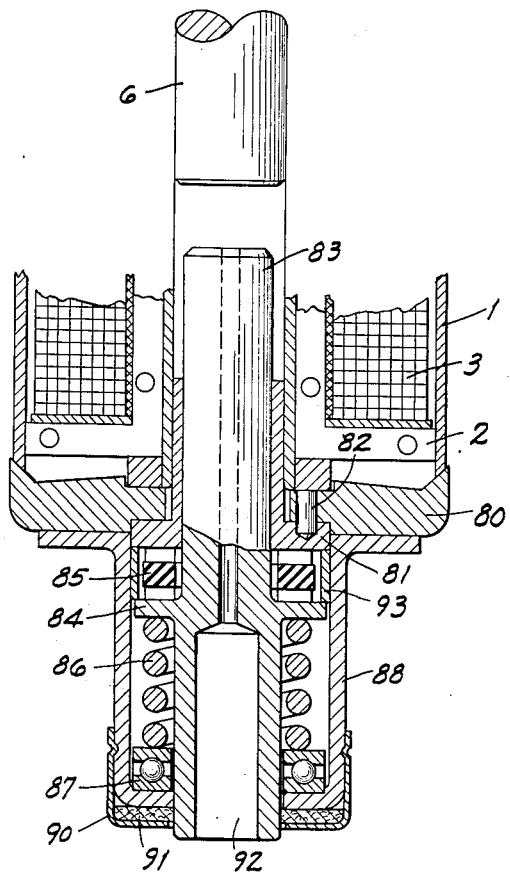
Fig. 9 is a sectional view with parts broken away of a single pawl operating mechanism.
Fig. 10 is an enlarged detailed view illustrating the flexing of a pawl.

Referring to the drawings an electromagnetic reciprocating tool is illustrated as being the device delivering reciprocating motion. Another type of reciprocating device could be employed such as an air hammer, a mechanical hammer and an internal combustion percussion tool. The electric hammer shown is provided with the cylindrical shell 1 that contains the multi-section core member 2 having spaced poles and provided with recesses to receive the coils 3 and 4. The core member 2 is mounted on the non-magnetic sleeve 5 in which the free piston 6 reciprocates when magnetically attracted by alternately energizing the electromagnetic coils 3 and 4. These coils are provided with insulating material, such as indicated at 7 which is interlocked in the notches 8 of the core member 2. The sections of the core member are spaced apart by the bridging members 10 which are made of non-magnetic metal and merely support the coils between the adjacent poles of the core member.

The upper end of the casing 1 is beveled to be received in the bell 11 of the handle member 12. The handle member is provided with a hand grip 13 and a switch 14 actuated by the switch operating member 15. The rear of the handles is provided with a chamber 16 and the center of which is provided with an opening to receive the bolt 17, which bolt is secured to the closing plate 18 and supports the rectifier 20. The wall of the chamber 16 of the handle is provided with a series of openings for the circulation of air. The plate 18 also supports the rubber member 21 which carries the strain relief for protecting the cable with its conductors to the electromagnetic reciprocating tool. This cable contains three wires, one of which is used to ground the casing and the other two are employed to energize the coils to actuate the reciprocating tool.

The rectifier 20 is a dry disk metal type all of which disks are stacked in the same direction and one side 28 of the alternating current source is supplied through the switch 14 to the center thereof, as shown at 23, and the opposite ends of the rectifier are connected to the posts 24 and 25 which are in turn connected to the ends of the coils 3 and 4, respectively. The other end of each coil 3 and 4 is connected together by the wire 26 and to the other side of the switch 14, thence to the other side of the alternating current supply 27.

The free piston following the alternate magnetic impulses reciprocates within the barrel and at one end strikes the rubber stop member 30 which is supported by the eyelet 31 through the plate 32. The spring 33 maintains the rubber stop 30 elevated in its upper position by being under compression between the plate 32 and the handle 12. The extension of the rubber stop 30 is provided with a bore which allows the ingress and egress of air from the interior of the tool. The rubber stop member 30 reciprocates within the sleeve 34 mounted in the handle member 12 and has clearance therewith, as shown at 29, which prevents binding of the stop in the bushing. If the stop jammed in operation it would change the preloading on the flexible pawls. The frame must be free to float to permit the pawls to return to their natural state of rest. They find their own balance under preload.

The lower end of the housing 1 of the electric reciprocating tool is provided with a nose casting 35 having a tool holder bushing 36 for receiving the upper end of the chuck tool or holder 37, the upper end 38 of which is commonly referred to as the anvil. The tool holder 37 is provided with an enlarged portion 40 which has an integral radial annular flange 41. The lower end of the chuck is provided with a socket to receive the tool members such as indicated at 42. There is a lateral opening 43 in the chuck through which to insert and drive the tapered end of a pin for the purpose of ejecting the tool 42.

The annular drive flange 41 on the tool holder is enclosed by two cup-shaped disks or washers 44 and 45 which provide oppositely disposed surfaces 46 and 47 that react with their respective sides of the flange 41. A plurality of annular flexible pawls 50 and 51 are disposed between the surfaces 46 and 47 and their respective surfaces of the flange 41.

As shown in Fig. 2 the cup-shaped members 44 and 45 are provided with the ears 53 and 54 which are oppositely disposed to each other and which are secured to the sleeves 55 and 56 that are attached to the lower end of the tie rods 57 and 58. The tie rods 57 and 58 extend to the opposite ends of the tool and are secured to the plate 32 by means of the nuts as shown. As shown in Fig. 2, a washer 59 is inserted between the ears of the opposite cup members to determine the relative position of these cup members to each other and, thus, determine the preload on the flexible pawl members 50 and 51. These washers 59 may be removed or reduced in thickness after the flexible pawl members have taken a set due to use or age and are relieved of some or all of their initial loading. If the frame that carries the pawl assembly and the stop were to jam or stick then a different loading would be applied to the pawls, but with the clearance around the stop, as shown at 29, the pawls will readily find their own equilibrium under the initial loading.

The bolts 60 and 61 hold the nose casting 35 and the handle member 12 in assembled relation on the cylindrical housing 1 as shown in Fig. 2. When the piston goes down and strikes the anvil 38 of the tool holder 37, the annular resilient pawl member 51 is flexed just before the tool strikes the object on which it is working. This movement relieves the initial pressure on the pawl 50 which returns to its normal shape. The reaction forces cause the tool to rebound and it may lift the tool holder, and the upper surface of the annular flange 41 exerts compressive forces against the annular flexible elastomer pawl member 50 between the upper surface of the flange 41 and the surface 46 of the cup 44 while the pawl member 51 is relieved of its initial compression forces. When the piston strikes the stop 30 on its return stroke the frame causes the cup member 45 to compress the pawl 51 and relax the pawl 50. Thus the rotary movement is delivered by a continuous series of impulses.

Since the pawls have their own period of vibration and are under initial pressure causing them to be partially flexed, one pawl becomes relaxed while the other is flexed and they overtravel. The flexed pawl transfers its energy to the unflexed pawl which becomes flexed while the pawl giving up its energy becomes relaxed or normal. If time permits the self-inflicted flexing and relaxing between the two pawls continues until the vibrations die out. The adjustments and selection of the pawls and stop are made to provide a proper natural period that coincides with the operation of the driving device or the electric impulses as in this instance.

Each time a pawl is flexed under compressive forces, whether directly by reason of the actuating member or due to the transfer of energy from one pawl to the other, they are effective in rotating the tool holder and the energy expended in this manner causes them to die down quickly between the action and reaction strokes.

The pawl member 50 is shown in Figs. 6, 7 and 8 and the pawl member 51 is shown in Figs. 3, 4 and 5. Each of these pawl members is constructed alike, but the pawl member 51, which takes the positive or the operating compressive forces from the working and reaction strokes, is made with a little heavier annular flange than the pawl member 50 which functions principally as a reflected reaction of the pawl 51. As the reciprocating piston 6 strikes the anvil 38 and moves the tool holder 37 downwardly which compresses the pawl member 51 to flex the same and relieves the initial pressure on the pawl 50. The force is also exerted against the disk 45 and through the connection of the rods 57 and 58, and the plate 32 compresses the spring 33 and draws the stop 30 toward the center of the tool and in position where it may be struck by the return movement of the piston 6.

As the piston 6 strikes the stop 30 compressing the same and returning the frame which again causes the pawl 51 to be flexed by the compressive forces due to the action of the disk 45 being lifted against the inertia of the tool holder. This positive compressive force, due to the return or reaction stroke, again unbalances the initial compressive forces on the pawls causing them to alternately flex and relax to rotate the tool holder until the forces die out allowing the pawls to again be subjected to their initial compressive force before the piston is again reversed and strikes the anvil of the tool holder.

When the piston is free of the stop 30, the lower pawl 51 becomes relaxed and shifts its compressive forces to the upper pawl and finally takes its normal shape. The frame becomes restored to its natural position when free of the piston.

Each of the annular pawl members 50 and 51, as shown in Figs. 3 to 8 inclusive, is constructed of suitable elastomer material such as natural or synthetic rubber or other resilient material that is capable of being flexed and of transmitting a force. As shown, each of the pawl members has a series of radially disposed flexible levers 62 of which there are eight in number in the circumference of the annular pawl of this particular structure. The top and bottom surface or feet of each lever 62 is triangularly shaped as indicated at 63. This increasingly smaller foot toward the center of the pawl together with the slight taper in the flange 41 provides even radial distribution of the rotary forces without excessive wear.

The lever 62 slopes downwardly from the top, as indicated at 64, to an annular web or ring, such as indicated at 65, and is preferably at an angle of 30° thereto. The underside of the lever 62 slopes, as indicated at 66, and terminates in the flat bottom 67, as shown in Figs. 4 and 7. It will be noted that the cam members 50 and 51 are identical, but for the thickness of the web and the directional slope of the levers.

The levers 72, as shown in Figs. 6, 7 and 8, have their upper surfaces 73 of triangular shape and the sloping surface 74 terminates in the annular ring 75 which is preferably midway between the upper and lower ends of the lever. The under surface of the lever slopes as indicated at 76 and terminates in the triangular portion 77.

As previously stated the levers 72 slope in the opposite direction than that of levers 62, thus when piston 6 strikes the anvil 38, it causes the undersurface of the annular flange 41 to compress the cam 51. The levers 62 are caused to flex which produces a slight rotary motion of the levers about their own axis, which motion pinches against the flange 41 causing the latter to rotate. Thus, as shown in Figs. 1 and 2, the tool holder 37 will rotate in a counterclockwise direction when viewed from the lower side of the tool.

In operation the device or the electric hammer, in this instance, may be said to reciprocate relative to the tool holder, and the tool holder is rotated when free of percussive loads or when the tool is not solidly engaging the work. Thus only a slight amount of energy is employed in rotating the tool.

The resiliency of the pawls and the stop are factors in the natural period of operating the device. These flexible elastomer parts should be of a hardness from fifty to seventy durometers. If too soft the deformation will be greater proportional than the rotation. After awhile the elastomer takes a set and thus loses the initial compressive forces, then the washer 59 must be removed to increase the compression; thus giving two operating phases to one set of pawls during their useful life. This may be represented by a peak in a graph of delivered torque plotted against preload on the pawls with the initial loading before the peak, and the spacer washers must then be removed after the set taken by the pawls places the operating position on the other side of the peak. The set in the pawls merely reduces the preload initial compressive force. While one washer is shown for removal and restoration of preload, it is possible to increase this number to obtain several operating phases before replacement of the pawls.

The bumper stop will also take a set after a time and cause the piston to drop out of synchronism with the current impulses. It must then be replaced.

The best performance of this rotary device is when the natural period of the frame is in step with the natural period of the piston, although the frame may oscillate between the time the piston strikes the anvil and the stop but the frame must get back in position in time, or be moving in the proper direction when the piston engages the anvil or the stop.

The upper pawl 50 functions principally on reactive forces of the lower pawl 51. Without this backlash the tool would have a tendency to oscillate rather than reciprocate.

When the pawl 51 is flexed by compressive forces, it moves faster than the pawl 50 can follow or relax. This results in little or no frictional drag by the pawl 50 when the pawl 51 is rotating the tool holder. Thus the flexibility of these members is important to their operation. If the pawl 50 is too flexible it cannot relax in time and ceases to function due to the reactive forces. The result is a stationary or an oscillatory motion of the tool holder. Thus a pawl must have a definite reaction to properly function.

If the pawls are too stiff the overtravel or reaction forces are damped out resulting in oscillatory and no rotary movement. Thus the natural period of vibration of the compressed pawls is very important to the successful operation of this invention.

The dual pawl structure shown in Fig. 1 may be replaced by a single pawl single action front end device, as shown in Fig. 9, wherein the return stroke of the piston is not employed. The nose 80 of the hammer has secured thereto the bushing 81 by means of the pin 82. The tool holder 83 has the annular flange 84. The pawl 85 is between the adjacent annular surfaces of the stationary bushing and the surface of the flange 84. The other side of the flange compresses the spring 86 against the thrust bearing 87 seated in the end of the cap 88 secured to the device. A dust cap 90 retains a felt washer 91 around the end of the tool holder 83 which has a non-round bore 92 in which to receive a tool of complementary shape.

When the hammer piston 6 strikes the tool holder 83, the spring 86 becomes compressed causing the pawl to relax. The spring then returns the tool holder causing it to go beyond its normal preloaded position, thus flexing the pawl and rotating the tool holder. This and other arrangements of a single acting pawl produce rotary movement of the tool holder. A spacer sleeve 93 may be used to limit the degree of flexing the pawl. This spacer ring merely rides between the bushing 81 and the flange 84.

When the pawl is flexed it assumes a tilted position such as illustrated in Fig. 10. The levers increase in their angular position and the intermediate web is twisted into a reverse curve.

The pawls shown may be stiffened by spring metal inserts as indicated at 94 in Fig. 10. The rate of movement of a steel spring is too fast and it dies out too rapidly. However, it produces greater torque if deformation is reduced.

All single acting devices operated from the front of the tool should have some form of thrust bearing as shown because they must be provided with some spring loading means.

We claim:

1. A device for translating reciprocating motion to rotary motion, comprising a support member, a member free to reciprocate and rotate relative to the support member, opposed annular surfaces carried by said members, and annular flexible pawl means mounted between and coacting with said opposed annular surfaces to rotate the reciprocating member when the pawl means is squeezed and flexed between said surfaces by the movement of the reciprocating member.

2. The structure of claim 1 characterized in that the annular surface on said reciprocating member is carried by an annular radial flange, and the annular surface on said support member is carried by an annular disk opposing said flange, and said flexible pawl means comprises an annular elastomer engaging with the surfaces of said flange and said disk.

3. The structure of claim 1 characterized in that the annular surfaces on said reciprocating member are the opposite sides of a radial flange, the annular surfaces on said support member are annular disks disposed on opposite sides of said flange and rigidly connected to each other, an oscillating impact member to strike said reciprocating member, a resilient stop disposed in the return path of the impact member, and means for connecting said disks and said resilient stop means as a unit carried by said support member and movable relative thereto.

4. The structure of claim 1 characterized in that the annular surfaces carried by said support member are annular disks opposed and rigidly connected to each other, an oscillatory impact member to strike said reciprocating member, a resilient stop member positioned in the return path of the impact member, and means for connecting said resilient stop member and said annular disks, said disks and stop member movable as a unit relative to said support member, the annular surfaces on said reciprocating member are two annular surfaces on an annular radial flange, said annular disks opposing the surfaces on an annular flange, and the annular flexible pawl means lies between each disk and said flange.

5. A device for translating reciprocating motion to rotary motion, comprising a support member, a reciprocating member guided on and free to rotate relative to the support member, means providing a plurality of pairs of opposed surfaces, one surface of each pair carried by each member, and flexible pawl means mounted between and coacting with each pair of surfaces to rotate the reciprocating member when the pawl means is squeezed and flexed between said surfaces by the movement of the reciprocating member.

6. A device for translating reciprocating motion to rotary motion, comprising a support member, a reciprocating member guided on and free to rotate relative to the support member, an annular flange carried by said reciprocating member, an annular disk mounted in operative spaced relation on each side of said annular flange and carried by said support member to provide opposed co-operative surfaces, pawl means constructed to flex in one direction and mounted between and coacting with the opposed co-operative surfaces on one side of said flange, and other pawl means constructed to flex in the other direction and mounted between and coacting with the opposed co-operative surfaces on the other side of said flange to rotate the reciprocating member.

7. The structure of claim 6 characterized in that one of said pawl means is heavier than the other pawl means.

8. A device for rotating the bit of a reciprocating tool which comprises a housing, a striking member mounted for reciprocation in said housing, a holder having a socket in one end to receive a bit, the other end of said holder supported to be hit by the striking member on its power stroke, a resilient stop mounted to be hit by the striking member on its return stroke, a radial flange on said holder, a disk supported on each side of said flange, rod means rigidly connecting the disks relative to each other and to said resilient stop to provide limited movement of the stop and disks relative to said housing and the holder, a flexible pawl mounted under initial pressure between each disk and its respective surface of said flange, one flexible pawl subjected to compression during the positive working and return strokes of the striking member, the reaction of said one flexible pawl causing the flexure of the other flexible pawl to rotate the holder in increment steps when subjected to compression of the power and return stroke of the reciprocating striking member.

9. The structure of claim 8 which also includes a spring means to urge the tool holder toward the striking member.

10. A device for rotating the bit of a reciprocating tool which comprises a support, a striker guided for reciprocation on said support, a holder means having a striking end and a socket on the other end to receive a bit, said holder means rotatably positioned in said support with the striking end in the path of said striker, a retainer means carried by said support, a reaction surface on one of said means, flexible pawl means mounted to lie between said reaction surface and the other of said means to flex when subjected to compression created by the impact action of said striker, the flexure of said flexible pawl means co-operating with said reaction surface and said means to produce rotary movement of the holder means.

11. A device for rotating the bit of a reciprocating tool which comprises a support, a striker guided for reciprocation on said support, a holder means having a striking end and a socket on the other end to receive a bit, said holder means rotatably positioned in said support with the striking end in the path of said striker, an annular flange on said holder means, a retainer means carried by said support and having an annular reaction surface positioned in opposed relation to one side of said annular flange, flexible pawl means mounted to lie between said reaction surface and said flange to flex when subjected to compression created by the impact action of said striker, the flexure of said flexible pawl means co-operating with said flange and said reaction surface to produce rotary movement of the holder means.

12. A device for rotating the bit of a reciprocating tool which comprises a support, a striker guided for reciprocation on said support, a holder means having a striking end and a socket on the other end to receive a bit, said holder means rotatably positioned in said support with the striking end in the path of said striker, an annular flange on said holder means, a retainer means carried by said support and having spaced annular reaction surfaces positioned in opposed relation to the opposite sides of said annular flange, flexible pawl means mounted to lie between said annular flange and each of said annular reaction surfaces to flex when subjected to compression created by the impact action of said striker, the flexure of both of said flexible pawl means co-operating with said flange and reaction surfaces to produce rotary movement of the holder means.

ARCHER W. RICHARDS.
ERVIN J. OSTERHUS.

References Cited in the file of this patent

UNITED STATES PATENTS

| Number | Name | Date |
|---|---|---|
| 2,110,957 | Kollock | Mar. 15, 1938 |
| 2,327,619 | Brown et al. | Aug. 24, 1943 |
| 2,536,971 | Weyandt et al. | Jan. 2, 1951 |